United States Patent
Kim (10) Patent No.: US 9,274,527 B2
(45) Date of Patent: Mar. 1, 2016

(54) PARKING CONTROL APPARATUS AND PARKING CONTROL METHOD

(71) Applicant: MANDO CORPORATION, Pyeongtaek-si, Gyeonggi-do (KR)

(72) Inventor: Sung Ju Kim, Seoul (KR)

(73) Assignee: Mando Corporation, Pyeongtaek-si, Gyeonggi-do (KR)

( * ) Notice: Subject to any disclaimer, the term of this patent is extended or adjusted under 35 U.S.C. 154(b) by 0 days.

(21) Appl. No.: 14/308,498

(22) Filed: Jun. 18, 2014

(65) Prior Publication Data
US 2015/0032319 A1 Jan. 29, 2015

(30) Foreign Application Priority Data

Jul. 26, 2013 (KR) ........................ 10-2013-0088812

(51) Int. Cl.
G05D 1/02 (2006.01)
B62D 15/02 (2006.01)

(52) U.S. Cl.
CPC ............ *G05D 1/0276* (2013.01); *B62D 15/027* (2013.01); *B62D 15/0285* (2013.01); *G05D 1/0214* (2013.01); *G05D 1/0238* (2013.01)

(58) Field of Classification Search
CPC ............. B62D 15/027; B62D 15/0285; G05D 1/0276; G05D 1/0238; G05D 1/0214
USPC ............................................................ 701/23
See application file for complete search history.

(56) References Cited

U.S. PATENT DOCUMENTS

| | | | |
|---|---|---|---|
| 8,244,457 B2 * | 8/2012 | Milark | G01S 15/18 123/349 |
| 2005/0035879 A1 * | 2/2005 | Gotzig | B60Q 9/006 340/932.2 |
| 2009/0309970 A1 * | 12/2009 | Ishii et al. | 348/143 |
| 2011/0087406 A1 * | 4/2011 | Barth | B62D 15/027 701/41 |

* cited by examiner

*Primary Examiner* — Fadey Jabr
*Assistant Examiner* — Aaron L Troost
(74) *Attorney, Agent, or Firm* — McDermott Will & Emery LLP (57) ABSTRACT

The present invention relates to a parking control apparatus and a parking control method. In particular, the present invention relates to a parking control apparatus and a parking control method in which an initial parking space searched while a vehicle is moved is corrected into a final parking space in a space recognition correction section based on a situation at the time of searching by the vehicle and information for an obstacle which is acquired while the vehicle moves along a first parking route, the position of the vehicle is changed, and then a final parking route is calculated.

7 Claims, 8 Drawing Sheets

AFTER CORRECTION OF PARKING SPACE

BEFORE CORRECTION OF PARKING SPACE

FIG.8

PARKING CONTROL APPARATUS AND PARKING CONTROL METHOD

CROSS-REFERENCE TO RELATED APPLICATION

This application claims priority from and the benefit under 35 U.S.C. §119(a) of Korean Patent Application No. 10-2013-0088812, filed on Jul. 26, 2013, which is hereby incorporated by reference for all purposes as if fully set forth herein.

BACKGROUND OF THE INVENTION

1. Field of the Invention

The present invention relates to a parking control apparatus and a parking control method.

2. Description of the Prior Art

Recently, traffic congestion and insufficient parking spaces have become serious social problems according to an increase of vehicles.

In particular, due to insufficient parking spaces, parking spaces are narrowed and thus, many drivers suffer from difficulty in parking. In connection with this, parking assistance systems that assist parking of a vehicle are actively developed.

Such a parking assistance system refers to a system configured to search a parking space and set a suitable parking route to perform a parking control when a driver wishes to park a vehicle, thereby assisting in the driver's parking.

However, such a parking assistance system has a problem in that the parking assistance system may not search a parking space correctly depending on a moving situation since the parking assistance system searches a parking space while the vehicle is moving.

The problem encountered due to such a parking space search is that when the parking control is performed using such a parking assistance system, collision of the vehicle, an incomplete parking situation, or the like may be caused, lowering confidence in the parking assistance system and causing an accident.

Accordingly, demands on improvement of confidence in a parking assistance system and a correct parking space search and parking route setting for execution of correct parking are increased.

SUMMARY OF THE INVENTION

In this background, an object of the present invention is to provide a parking control apparatus in which an initial parking space searched while a vehicle is moved is corrected into a final parking space in a space recognition correction section based on a situation at the time of searching by the vehicle and information for an obstacle which is acquired while the vehicle moves along a first parking route, the position of the vehicle is changed, and then a final parking route is calculated.

In order to achieve the above-described object, according to an aspect of the present invention, there is provided a parking control apparatus including: an initial parking space setting unit configured to set an initial parking space by receiving an input of information for at least one obstacle positioned around a moving vehicle from a first sensor so as to search a parking space; a vehicle control unit configured to calculate a first parking route using information for the initial parking space and to control the vehicle to move along the first parking route; a parking space correction unit configured, when it is determined that the vehicle exists in a space recognition correction section, to correct the initial parking space based on information for an obstacle recognized in the space recognition correction section so as to set a final parking space, the space recognition correction section being a section where, among obstacles positioned on opposite sides of the initial parking space, an obstacle positioned closer to the vehicle is recognized through a second sensor while the vehicle moves along the first parking route; and a final parking route calculation unit configured, when it is determined that the vehicle enters a route correction control section, to control the vehicle to change a position thereof and to calculate a final route based on information for the final parking space and information for a changed position of the vehicle, the route correction control section being set to extend by a predetermined distance from an end point of the space recognition correction section.

According to another aspect of the present invention, there is provided a parking control method including: setting an initial parking space by receiving an input of information for at least one obstacle positioned around a moving vehicle from a first sensor so as to search a parking space; calculating a first parking route using information for the initial parking space and controlling the vehicle to move along the first parking route; when it is determined that the vehicle exists in a space recognition correction section, correcting the initial parking space based on the obstacle recognized in the space recognition correction section so as to set a final parking space, the space recognition correction section being a section where, among obstacles positioned on opposite sides of the initial parking space, an obstacle positioned closer to the vehicle is recognized through a second sensor while the vehicle moves along the first parking route; and when it is determined that the vehicle enters a route correction control section, controlling the vehicle to change a position thereof and calculating a final parking route based on information for the final parking space and information for a changed position of the vehicle, the route correction control section being set to extend by a predetermined distance from an end point of the space recognition correction section.

As described above, according to the present invention, it is possible to provide a parking control apparatus in which an initial parking space searched while the a vehicle is moved is corrected into a final parking space in a space recognition correction section based on a situation at the time of searching by the vehicle and information for an obstacle which is acquired while the vehicle moves along a first parking route, the position of the vehicle is changed, and then, a final parking route is calculated.

In addition, according to the present invention, even if the vehicle does not correctly search the parking space in the course of parking search, information of an obstacle is additionally acquired, the position of the vehicle is changed, and then, the final parking space is calculated. As a result, it is possible to prevent a collision accident while the vehicle is parked and to park the vehicle more correctly.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE EXEMPLARY EMBODIMENTS

The present invention discloses a parking control apparatus and a parking control method.

Hereinbelow, some exemplary embodiments of the present invention will be described in detail with reference to illustrative drawings. In the description of the elements of the present invention, terms "first", "second", "A", "B", "(a)", "(b)" and the like may be used. These terms are merely used to distinguish one structural element from other structural elements, and a property, an order, a sequence and the like of a corresponding structural element are not limited by the term. It should be noted that if it is described in the specification that one component is "connected," "coupled" or "joined" to another component, a third component may be "connected," "coupled," and "joined" between the first and second components, although the first component may be directly connected, coupled or joined to the second component.

Figure 1:
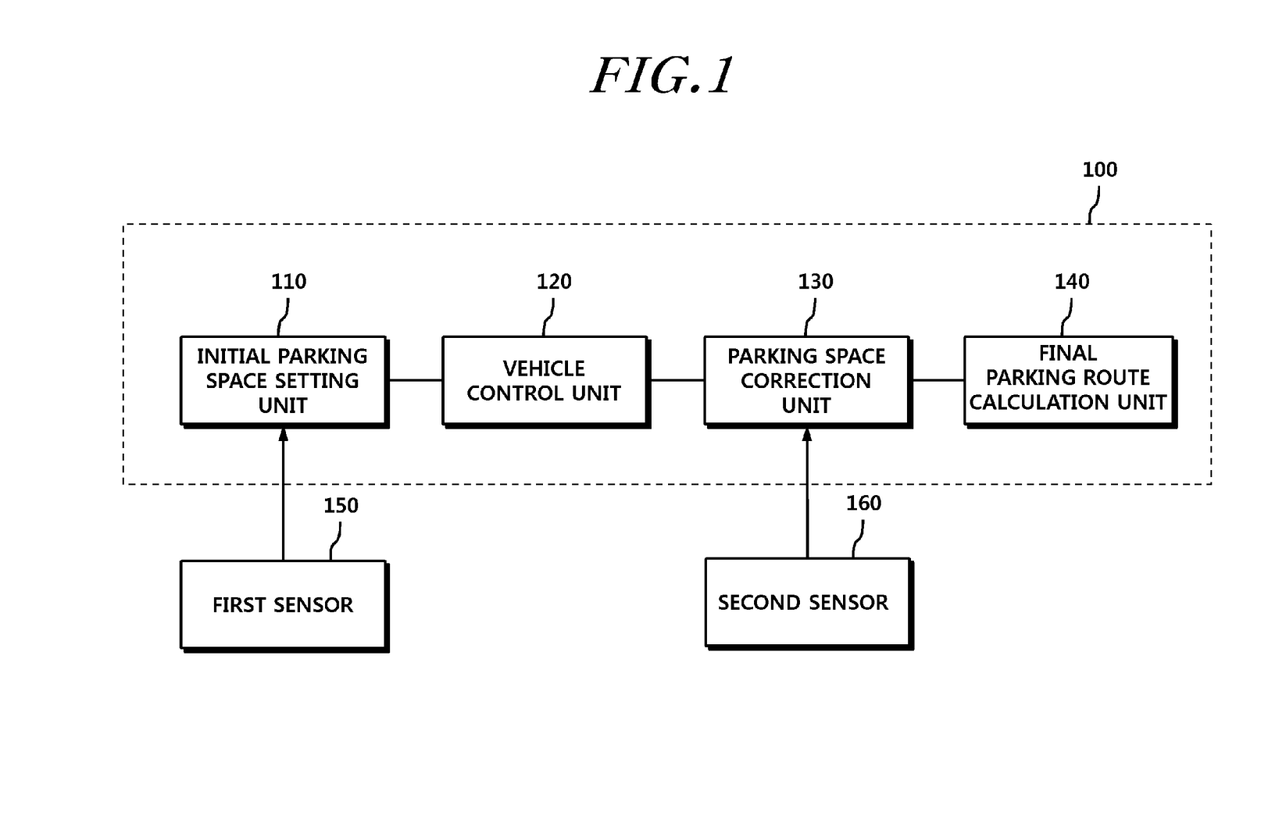
FIG. 1 is a block diagram of a parking control apparatus according to an exemplary embodiment of the present invention.

FIG. 1 is a block diagram of a parking control apparatus 100 according to an exemplary embodiment of the present invention.

The parking control apparatus 100 according to the exemplary embodiment of the present invention may include: an initial parking space setting unit 110 configured to set an initial parking space by receiving an input of information for at least one obstacle positioned around a moving vehicle from a first sensor 150 so as to search a parking space; a vehicle control unit 120 configured to calculate a first parking route using information for the initial parking space and to control the vehicle to move along the first parking route; a parking space correction unit 130 configured, when it is determined that the vehicle exists in a space recognition correction section, to correct the initial parking space based on information for an obstacle recognized in the space recognition correction section based on the information for the obstacle recognized in the space recognition correction section to as to set a final parking space, the space recognition correction section being a section where, among obstacles positioned on opposite sides of the initial parking space, an obstacle positioned closer to the vehicle is recognized through a second sensor 160 while the vehicle moves along the first parking route; and a final parking route calculation unit 140 configured, when it is determined that the vehicle enters a route correction control section, to control the vehicle to change a position thereof and to calculate a final parking route on information for the final parking space and information for a changed position of the vehicle, the route correction control section being set to extend by a predetermined distance from an end point of the space recognition correction section.

Now, each component will be described with reference to FIG. 1, as an example. The initial parking space setting unit 110 may determine whether there is a parkable space for a vehicle by receiving an input of parking space search information from the first sensor 150 which is mounted on the vehicle to be capable of sensing a situation around the vehicle such as an obstacle, a vehicle and a space around the vehicle from the first sensor 150 and when it is determined that there is a parkable space, the initial parking space setting unit 110 may set the parkable space as an initial parking space.

For example, the vehicle control unit 120 may calculate the first parking route based on at least one piece of information among information for a current position of the vehicle, the initial parking space, and the obstacle such that the vehicle may be parked in the initial parking space which is a target position for parking the vehicle. When the first parking route is calculated, the vehicle control unit 120 may control at least one apparatus among apparatuses needed for moving the vehicle such as a steering apparatus and a braking apparatus of the vehicle such that the vehicle may be parked in the initial parking space without being deviated from the first parking route.

In addition, the parking space correction unit 130 may control the second sensor 160 to sense an obstacle closer to the vehicle while the vehicle is moving along the first parking route among obstacles positioned adjacent to the opposite sides of the initial parking space while the vehicle is moving along the first parking route, and may correct the initial parking space based on information for the sensed obstacle and information for the initial parking space so as to set the final parking space to park the vehicle.

As an example, the second sensor 160 may sense obstacle information including at least one of coordinate information of the above-described obstacles, parking angle information of the obstacles, and separation distance information between the vehicle and the obstacles.

When it is impossible to park the vehicle in the space set as the final parking space based on the obstacle information and the information for the initial parking space due to an obstacle or the like, a control may be performed such that the parking assistance control of the vehicle may be stopped and the driver may be informed that the parking cannot be completed.

In addition, the parking space correction unit 130 compares information for an obstacle and the first parking route in the space recognition correction section and when collision between the vehicle and the obstacle is forecasted, the parking space correction unit 130 may correct the first parking route so as to correct the route of the vehicle such that the obstacle can be recognized without causing the vehicle to collide with the obstacle.

For example, when it is determined that the vehicle enters into the route correction control section pre-set to extend by a predetermined distance from the point where the space recognition correction section is ended, the final parking route calculation unit 140 may control the vehicle to change the position of the vehicle and calculate the final parking route to park the vehicle in the final parking space based on the information for the above-described final parking space and the information for the current changed position of the vehicle.

In addition, when the final parking route is calculated, the braking apparatus and the steering apparatus may be controlled along the final parking route calculated as described above so that the vehicle can be parked in the final parking space.

The parking control apparatus discussed herein may be used in a parking assistance system, in which the parking assistance system may refer to a system capable of providing convenience for the driver in the course of parking the vehicle or may refer to a system capable of controlling the vehicle to be parked in a target parking space. In such a case, the vehicle may control only the steering apparatus, only the braking apparatus, or all the apparatuses in the vehicle which are needed for moving the vehicle, including the steering apparatus and the braking apparatus.

Meanwhile, for example, the first sensor 150 used in the initial parking space setting unit 110 may refer to a sensing device capable of sensing an external situation of the vehicle and may include at least one sensor among an ultrasonic sensor and a camera sensor mounted on a front side, a rear side, or a lateral side of the vehicle.

In addition, for example, the second sensor 160 used in the parking space correction unit 130 may refer to a sensing device capable of sensing an obstacle or a space positioned on a side of the vehicle. The second sensor 160 may be the same as the above-described first sensor 150 or the function of the second sensor 160 may be performed by a sensor capable of sensing a lateral side among the sensors included in the first sensor 150. Further, the second sensor 160 may be a sensor including one or more sensors among an ultrasonic sensor and a camera sensor which are additionally mounted separately from the first sensor 150.

In addition, the "obstacle" herein may be another vehicle parked adjacent to a space set as a parking space, or may include an element which occupies a space adjacent to the parking space to be an obstacle to the parking of the vehicle, such as a pillar or a wall. Meanwhile, the "closer obstacle" which may be sensed by the above-described second sensor may refer to an obstacle which is sensed first while the vehicle is moving along the first parking route among the obstacles positioned adjacent to the initial parking space. For example, when other vehicles are parked on the left, right, front, or rear side of the initial parking space, the "closer obstacle" may be a vehicle recognized first through the second sensor while the vehicle moves forward along the first parking route for parking.

Hereinafter, for the convenience of description, an obstacle or obstacles may be referred to as "other vehicle(s)". However, it shall be noted that the obstacles are not limited to the other vehicles but include an element which occupies a space adjacent to the parking space and thus, may be an obstacle at the time of parking a vehicle, as described above.

Figure 2:
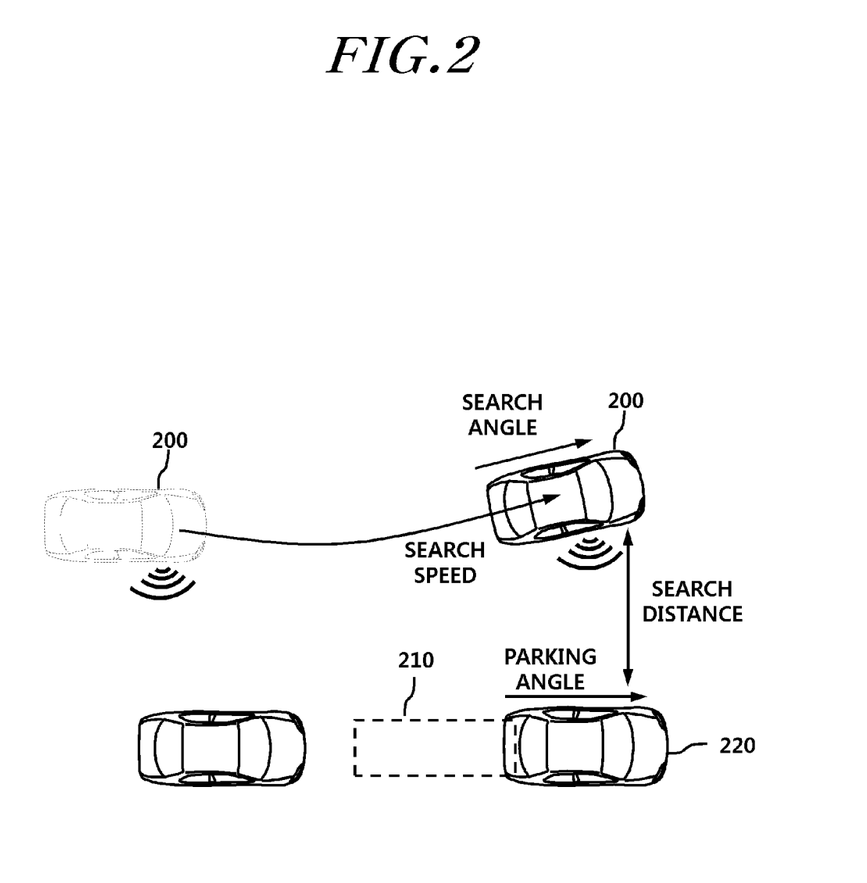
FIG. 2 is a view illustrating, as an example, a process of setting an initial parking space by an initial parking space setting unit according to the exemplary embodiment of the present invention.

FIG. 2 is a view illustrating, as an example, a process of setting an initial parking space 210 by the initial parking space setting unit 110 according to the exemplary embodiment of the present invention.

Referring to FIG. 2, the initial parking space setting unit 110 may control the first sensor 150 mounted on a vehicle 200 according to a parking control initiation signal input through a parking control switch to receive an input of parking search information including information for an obstacle 220 and a parking space acquired while the vehicle 200 moves, and may set an initial parking space 210 based on the parking search information.

Specifically, the initial parking space setting unit 110 may determine the existence of the obstacle 220 and information for a corner point of the obstacle 220 based on information, such as the intensity of ultrasonic waves received by the first sensor 150 after being transmitted by the first sensor 150 and a length of time until the ultrasonic waves are received, so as to recognize a parking space, and may set the initial parking space 210 where the vehicle 200 may be parked.

However, in the process of searching the parking space, the vehicle 200 searches the parking space while moving. Thus, setting accuracy of the initial parking space 210 may be varied depending on a search angle, a search speed, and a search distance of the vehicle.

As illustrated in FIG. 2, for example, when the search angle of the vehicle 200 does not conform to the parking angle of the obstacle 220 and when the search distance of the vehicle 200 to the obstacle 220 is too long or too short, the initial parking space 210 may be erroneously set to overlap with the obstacle 220.

Figure 3:
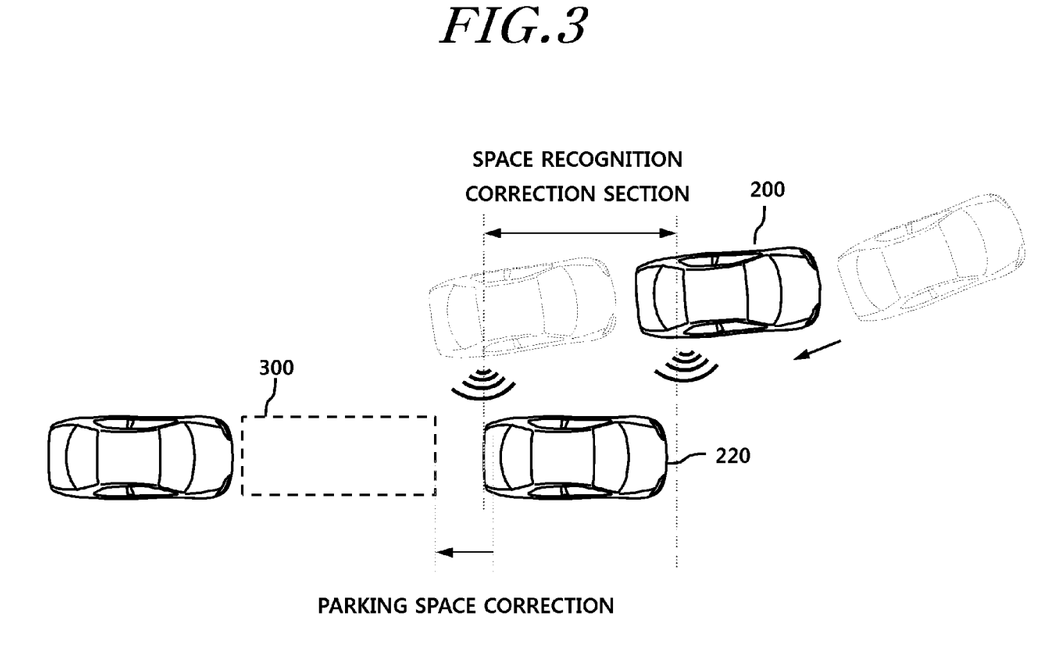
FIG. 3 is a view illustrating, as an example, a process of acquiring information for an obstacle by a parking space correction unit in a space recognition correction section to set a final parking space, according to the exemplary embodiment of the present invention.

FIG. 3 is a view illustrating, as an example, a process of acquiring information for an obstacle 220 by the parking space correction unit 130 in a space recognition correction section to set a final parking space 300, according to the exemplary embodiment of the present invention.

When it is determined that the vehicle 200 exists in a space recognition correction section which is a section in which, among obstacles positioned on opposite sides of the initial parking space 210, an obstacle closer to the vehicle is recognized through the second sensor 160 while the vehicle 200 is moving along the first parking route, the parking space correction unit 130 according to the exemplary embodiment of the present invention may correct the initial parking space 210 based on the information for the obstacle 220 recognized in the space recognition correction section to set the final parking space 300.

Referring to FIG. 3, when it is determined that the vehicle 200 exists in a space recognition correction section which is a section in which, among obstacles positioned adjacent to the initial parking space 210, a firstly recognized obstacle exists while the vehicle 200 is moving along the first parking route calculated by the vehicle control unit 120 after the vehicle 200 has finished the parking space search process, the parking space correction unit 130 may control the second sensor 160 to acquire information for the obstacle 220 and set the final parking space 300 using the acquired information for the obstacle 220.

As illustrated in FIG. 3, for example, when the obstacle 220 is recognized while the vehicle 200 is controlled to move in a reverse direction, the parking space correction unit 130 determines that the vehicle 200 enters the space recognition correction section and receives an input of information for the obstacle 220 using the second sensor 160. Then, the parking space correction unit 130 may perform correction of the parking space using the information for the obstacle 220 and the information for the initial parking space 210 which are input thereto so as to set the final parking space 300 which does not overlap with the obstacle 220.

FIG. 3 only illustrates, as an example, the case where the initial parking space 210 is recognized to overlap with the obstacle 220. However, even when the initial parking space 210 is set to be askew in angle or to protrude out from the adjacent obstacle 220 due to a problem of a search angle, a search distance, a search speed, or the like which may occur in the above-described process of searching the parking space 210 of the initial parking space 210, the parking space correction unit 130 may recognize the obstacle 220 and set the final parking space 300.

The parking space correction unit 130 according to the exemplary embodiment of the present invention may compare the information for the obstacle 220 in the space recognition correction section and the first parking route, and when collision between the vehicle 200 and the obstacle 220 is forecasted, the parking space correction unit 130 may correct the first parking route so as to correct the route of the vehicle 200 such that the vehicle 200 may recognize the obstacle 220 without colliding with the obstacle 220.

Specifically, referring to FIG. 3, for example, the parking space correction unit 130 may correct the initial parking space 210 using the information for the obstacle 220 recognized in the space recognition correction section where the vehicle 200 recognizes the obstacle 220 while moving along the first parking route so as to set the final parking space 300, and in order to prevent the vehicle 200 from colliding with the obstacle 220, the parking space correction unit 130 may correct the first parking route so as to control the vehicle 200 such that the accuracy of recognition for the obstacle 220 can be enhanced.

That is, for example, when the vehicle 200 moves along the first parking route, the parking space correction unit 130 compares the first parking route with the information for the obstacle 220 which is input from the second sensor, and when collision of the vehicle 200 with the obstacle 220 is forecasted, the parking space correction unit 130 may correct the first parking route so as to control the movement of the vehicle 200 to the route where the vehicle 200 may recognize the obstacle 220 without colliding with the obstacle 220.

Figure 4:
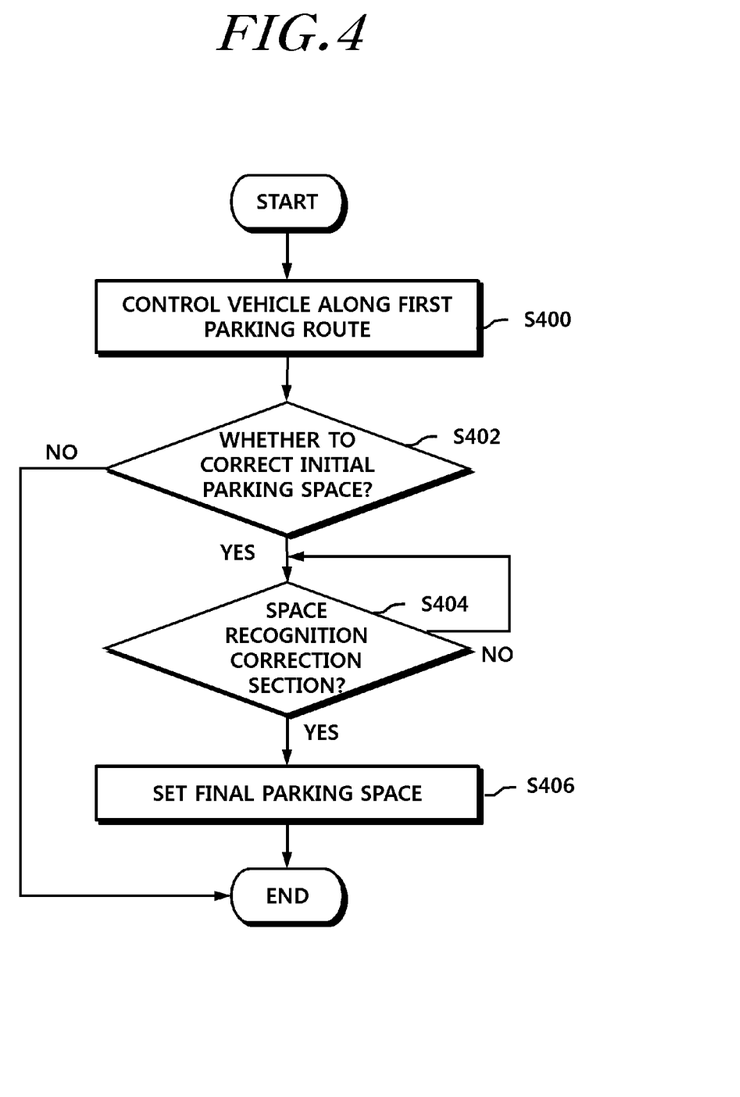
FIG. 4 is a view illustrating, as an example, a process of setting the final parking space by a parking space correction unit according to the exemplary embodiment of the present invention.

FIG. 4 is a view illustrating, as an example, a process of setting the final parking space 300 by the parking space correction unit 130 according to an exemplary embodiment of the present invention.

The parking space correction unit 130 according to the exemplary embodiment of the present invention may determine whether to correct the initial parking space based on at least one piece of information among the information for a search speed of the vehicle, a search angle formed by the obstacle and the vehicle, and a search distance between the obstacle and the vehicle at the time of searching the parking space (S402).

In addition, the parking space correction unit 130 according to the exemplary embodiment of the present invention may correct the initial parking space when at least one of a situation where the search speed exceeds a reference speed, a situation where the search angle exceeds a reference angle, and a situation where the search distance is deviated from a reference range has occurred.

Referring to FIG. 4, when the vehicle control according to the first parking route is performed by the vehicle control unit 120 (S400), the parking space correction unit 130 may determine whether it is necessary to correct the initial parking space based on at least one piece of information among the information of the search speed of the vehicle, the search angle, and the search distance at the time of setting the initial parking space.

For example, when the search speed of the vehicle is too fast in searching the parking space while the vehicle is moving, the information for an obstacle or the like which is input by the first sensor 150 may lack reliability. Likewise, for example, when the parking angle of the vehicle is inclined to be deviated from the parking angle of a vehicle parked adjacent to the parking space over a reference angle, the first parking space may be set to be askew. Further, when the search distance is too long or too close to the parking space, signals of a sensor may be reflected by an obstacle or the like to affect the signal reception rate, causing a situation in which the initial parking space may not be set correctly.

Accordingly, for example, the parking space correction unit 130 determines whether to correct the initial parking space based on the information for the search speed, the search angle, and the search distance at the time of searching the parking space as described above (S402). When it is determined that the correction for the initial parking space is necessary, the parking space correction unit 130 may determine whether the vehicle is in the space recognition correction section (S404), and set the final parking space (S406).

In addition, the parking space correction unit 130 compares a reference speed, a reference angle, and a reference range of search distance which have been set in advance through a test or the like and the above-described information for the search speed, the search angle, and the search distance so as to determine whether to correct the initial parking space (S402).

For example, as a result of determination, when it is determined that the correction is not necessary, the parking space correction unit 130 does not perform the correction of the parking space, and the vehicle may be parked in the initial parking space along the first parking route calculated by the vehicle control unit 120.

For example, the parking space correction unit 130 may obtain the above-mentioned information such as the search speed, the search angle, and the search distance from various sensors or the like installed inside or outside the vehicle.

Figure 5:
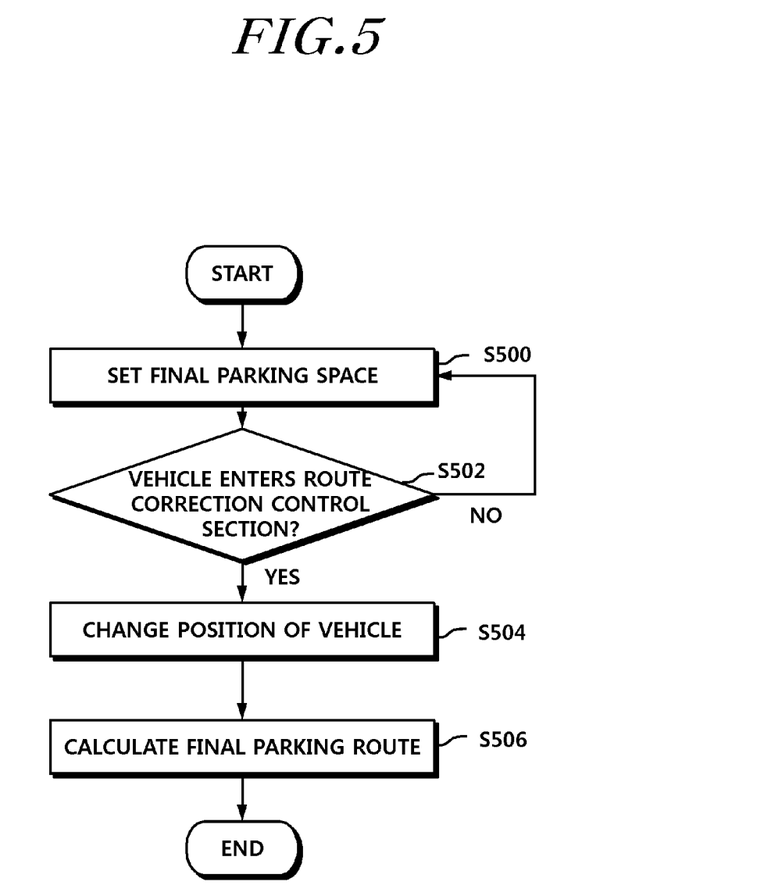
FIG. 5 is a flowchart illustrating, as an example, a process of calculating the final parking route by a final parking route calculation unit according to the exemplary embodiment of the present invention.

FIG. 5 is a flowchart illustrating, as an example, a process of calculating the final parking route by the final parking route calculation unit 140 according to an exemplary embodiment of the present invention.

Upon determining that the vehicle has entered into the route correction control section (S502), according to the exemplary embodiment of the present invention, the final parking route calculation unit 140 may control the vehicle to change the position based on the information for an obstacle recognized in the space recognition correction section (S504).

Referring to FIG. 5, the final parking route calculation unit 140 may determine whether the vehicle which is subjected to a parking control has entered the route correction control section which is a section of a pre-set distance past the space recognition correction section where the above-mentioned obstacle is recognized (S502), and when it is determined that the vehicle has entered the route correction control section, the final parking route calculation unit 140 may control the vehicle to change the position (S504), and calculate the final parking route for parking the vehicle in the final parking space based on the changed position of the vehicle and the final parking space information set by the parking space correction unit (S506).

In addition, when the above-described final parking route is calculated, the first parking route is corrected such that the vehicle may move along the final parking route to be parked in the final parking space.

Specifically, the route correction control section may refer to a section extending over a pre-set distance from a point where a corner of an end portion of an obstacle is recognized in the space correction recognition section. Upon determining that the corner of the end portion of the obstacle is recognized, the final parking route calculation unit 140 may determine that the vehicle has entered the route correction control section.

Figure 6:
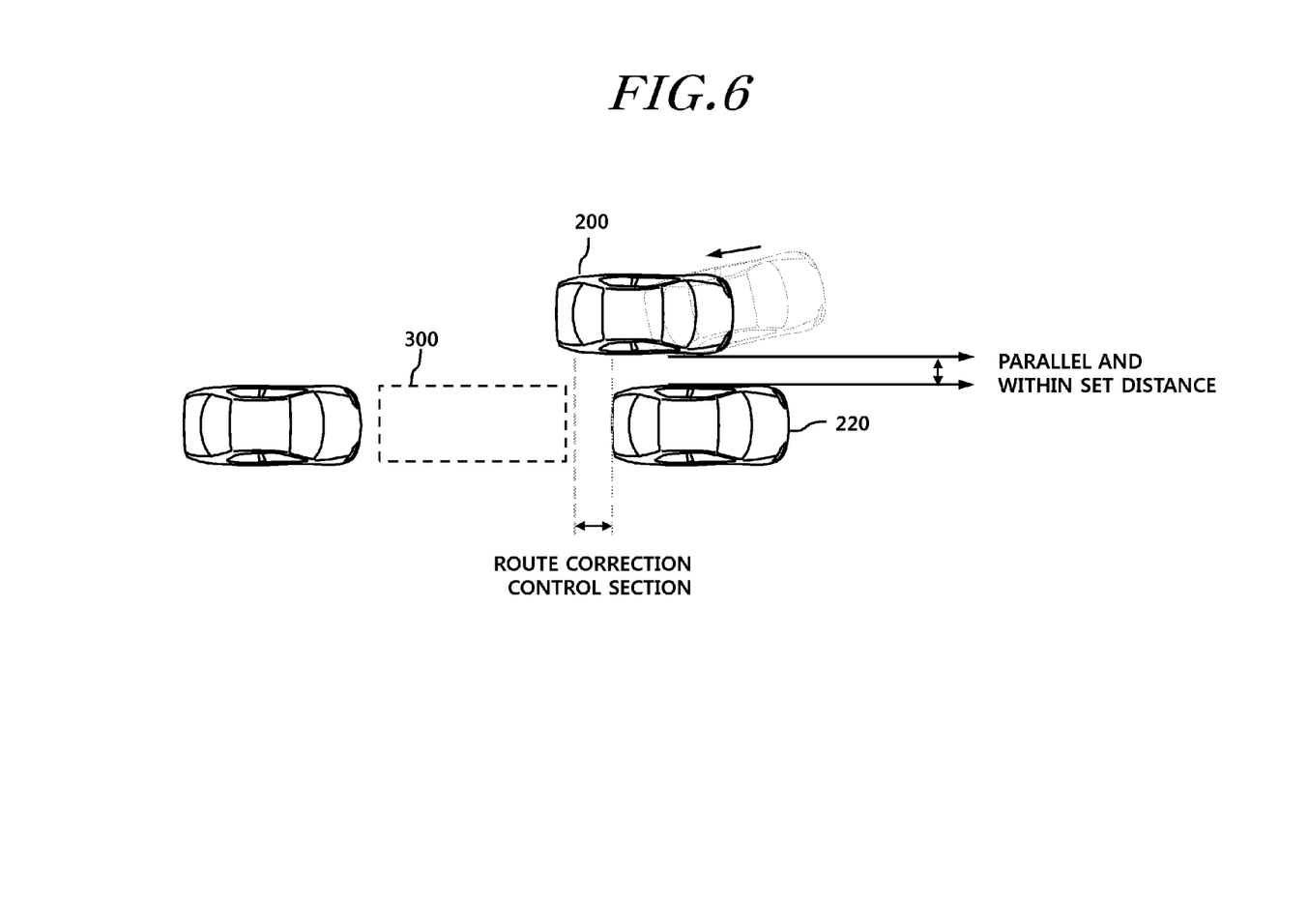
FIG. 6 is a view illustrating, as an example, a process of controlling a vehicle to change a position thereof by the final parking route calculation unit according to the exemplary embodiment of the present invention.

FIG. 6 is a view illustrating a process of controlling a vehicle 200 to change a position thereof by the final parking route calculation unit 140 according to exemplary embodiment of the present invention as an example.

According to the exemplary embodiment of the present invention, the final parking route calculation unit 140 may control the vehicle 200 to change the position such that vehicle 200 is positioned within the set distance range from the obstacle 220 and that the obstacle 220 and the vehicle 200 are parallel to each other.

Referring to FIG. 6, for example, when the corner point of the end portion of the obstacle 220 is recognized and the vehicle 200 enters a point where the space recognition correction section is ended, the final parking route calculation unit 140 may determine that the vehicle 200 enters the route correction control section, and may control the vehicle 200 to change the position of the vehicle 200.

Specifically, when it is determined that the vehicle 200 has entered the route correction control section, the final parking route calculation unit 140 may control the position of the vehicle 200 such that the vehicle 200 is positioned within the pre-set distance range from the obstacle 220 and that the parking angle of the obstacle 220 and the angle of the vehicle 200 are parallel to each other.

That is, the final parking route calculation unit 140 may correct the position information of the vehicle 200 such that the vehicle 200 can be correctly parked in the final parking space 300 by performing a control such that the vehicle 200 is positioned within the pre-set distance range from the obstacle 220 and the parking angle of the obstacle 220 and the angle of the vehicle 200 are parallel to each other.

In addition, the final parking route calculation unit 140 may calculate the parking route which may cause the vehicle 200 to be parked in the final parking space based on the information for the final parking space 300 set by the parking space correction unit 130 and the vehicle position information obtained by correcting the position of the vehicle 200, change the first parking route into the final parking route, and control the vehicle 200 to be parked.

Figure 7:
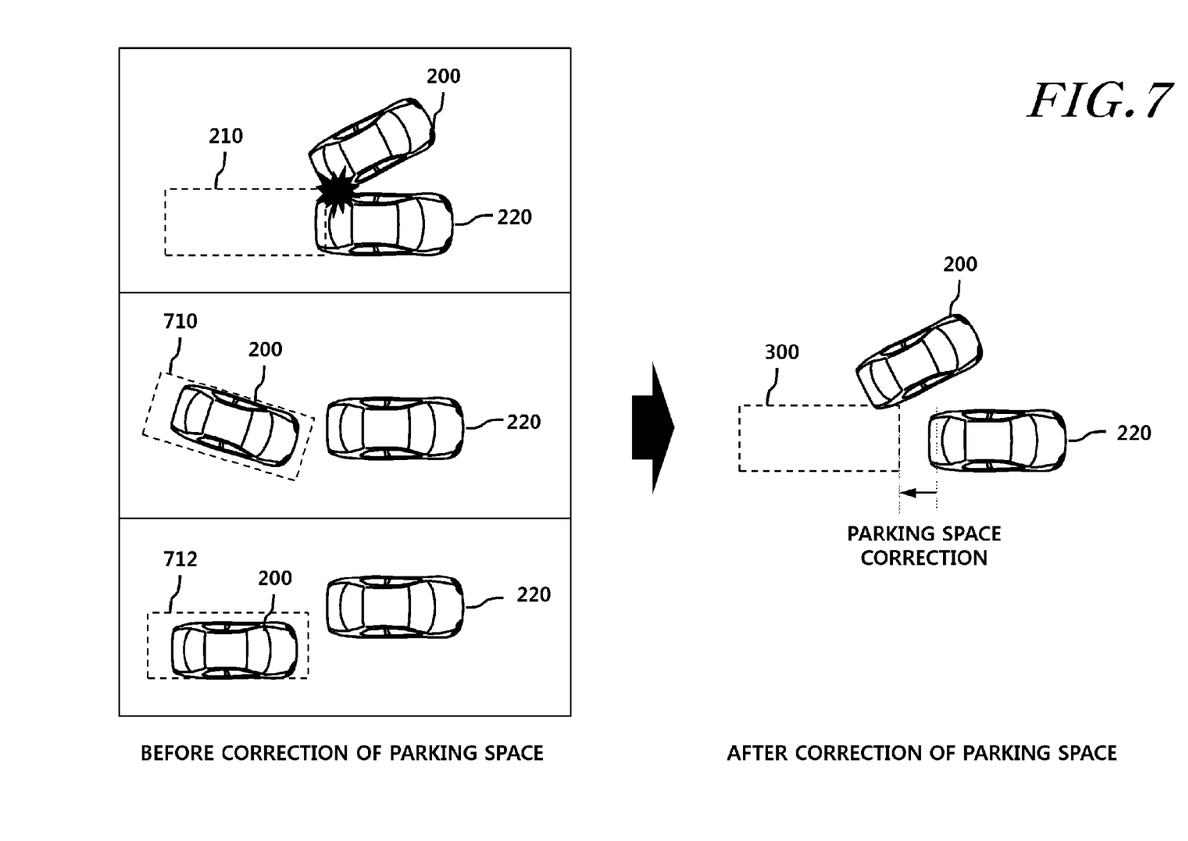
FIG. 7 is a view illustrating, as an example, parking states before and after the parking space is corrected by a parking control apparatus according to the exemplary embodiment of the present invention.

FIG. 7 is a view illustrating, as an example, parking states before and after the parking space is corrected by the parking control apparatus 100 according to an exemplary embodiment of the present invention.

Referring to FIG. 7, before the parking control apparatus 100 corrects the parking space to set a final parking space 300, an initial parking space 210 may be set to overlap with the obstacle 220, an initial parking space 710 may be set not to be parallel to the parking angle of the obstacle 220, or an initial parking space 712 may be set deeper or shallower than an obstacle 220 due to problems according to a search speed, a search angle, and a search distance which may be caused in the process of searching the parking space. Thus, it is difficult to park the vehicle 200 correctly.

However, when the parking space is corrected by the parking control apparatus 100 according to the exemplary embodiment of the present invention, the correct final parking space 300 may be correctly set according to the correction and the vehicle may be aligned with the obstacle 220 to be correctly parked in a target parking space.

Hereinafter, descriptions will be made on a parking control method according to an exemplary embodiment of the present invention which may be executed using the parking control according the exemplary embodiment of the present invention described above with reference to FIGS. 1 to 7.

Figure 8:
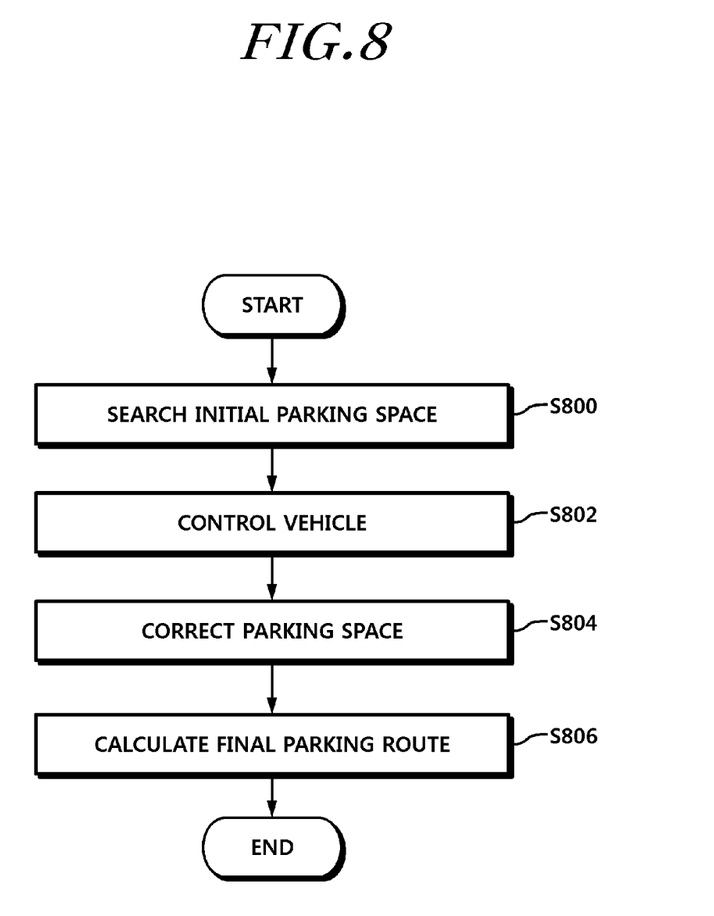
FIG. 8 is a flowchart for a parking control method according to another exemplary embodiment of the present invention.

FIG. 8 is a flowchart for a parking control method according to another exemplary embodiment of the present invention.

A parking control method according to an exemplary embodiment of the present invention may include: setting an initial parking space by receiving an input of information for at least one obstacle positioned around a moving vehicle from a first sensor so as to search a parking space (S800); calculating a first parking route using information for the initial parking space and controlling the vehicle to move along the first parking route (S802); when it is determined that the vehicle exists in a space recognition correction section, correcting the initial parking space based on the obstacle recognized in the space recognition correction section so as to set a final parking space, the space recognition correction section being a section where, among obstacles positioned on opposite sides of the initial parking space, an obstacle positioned closer to the vehicle is recognized through a second sensor while the vehicle moves along the first parking route (S804); and when it is determined the vehicle enters a route correction control section, controlling the vehicle to change a position thereof and calculating a final parking route based on information for the final parking space and information for a changed position of the vehicle, the route correction control section being set to extend by a predetermined distance from an end point of the space recognition correction section (S806).

Referring to FIG. 8, in the searching of the initial parking space, the first sensor may be controlled while the vehicle moves so as to set the initial parking space where the vehicle may be parked (S800). In the controlling of the vehicle, the first parking route for parking the vehicle in the initial parking space is calculated using position information for the initial parking space and the vehicle and then, at least one of apparatuses that control the movement of the vehicle such as a steering apparatus and a braking apparatus of the vehicle may be controlled such that the vehicle moves along the first parking route (S802).

In addition, in the correcting of the parking space, when the vehicle enters the space recognition correction section while the vehicle moves along the first parking route, among obstacles positioned on opposite sides of the initial parking space, an input of information for an obstacle closer to the vehicle which is moving along the first parking route is received by controlling a second sensor and the final parking space determined by correcting the initial parking space may be set (S804).

In the calculating of the final parking route, when the vehicle enters the route correction control section, the vehicle may be controlled to change the position thereof, and the final parking route for allowing the vehicle to be parked in the final parking space may be calculated based on the information for the final parking space and information for the changed position of the vehicle (S806).

The above-described parking control method will be described in more detail as an example. In the correcting of the parking space, it is determined whether the vehicle has entered the space recognition correction section. When it is determined that the vehicle does not enter the space recognition correction section, the control of the vehicle along the first parking route is continuously performed such that the vehicle may be parked in the initial parking space. When it is determined that the vehicle has entered the space recognition correction section, the above-described obstacle is sensed using the second sensor of the vehicle and the final parking space may be set based on the information for the initial parking space and the information for the obstacles (S804).

In the calculating of the final parking route, it is determined whether the vehicle has entered the route correction control section. When it is determined that the vehicle has entered the route correction control section, the final parking route may be calculated by controlling the vehicle such that the distance between the vehicle and the obstacle is maintained within a pre-set distance range, and controlling the position of the vehicle such that an angle of the vehicle and a parking angle of the obstacle are equal to each other and thus, the vehicle and the obstacle are parallel to each other (S806).

As described above, according to the present invention, it is possible to provide a parking control apparatus in which an initial parking space searched during the movement of a vehicle is corrected into a final parking space in a space recognition correction section based on a situation at the time of searching and information for an obstacle which is acquired during the movement along a first parking route and the position of the vehicle is changed so as to calculate a final parking route.

In addition, according to the present invention, even if the vehicle does not correctly search a parking space in the course of a parking search, information of an obstacle is additionally acquired and the position of the vehicle is so as to calculate the final parking space. As a result, it is possible to prevent a collision accident while parking the vehicle and to park the vehicle more correctly.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units. Although the embodiments of the present invention have been described for illustrative purposes, those skilled in the art will appreciate that various modifications, additions and substitutions are possible, without departing from the scope and spirit of the invention. The scope of the present invention shall be construed on the basis of the accompanying claims in such a manner that all of the technical ideas included within the scope equivalent to the claims belong to the present invention.

What is claimed is:

1. A parking control apparatus comprising:
   a first unit including a first sensor, the first unit configured to set an initial parking space by receiving an input of information for at least one obstacle positioned around a moving vehicle from the first sensor to search a parking space, configured to calculate a first parking route using information for the initial parking space, and configured to control the vehicle to move along the first parking route; and
   a second unit including a second sensor, the second unit configured to determine whether to correct the initial parking space based on a parking space searching speed of the vehicle, configured to correct the initial parking space based on the information for the at least one obstacle recognized in a space recognition correction section to set a final parking space when it is determined that the vehicle exists in the space recognition correction section and the parking space searching speed exceeds a reference speed, and configured to control the vehicle to change a position thereof and to calculate a final parking route on information for the final parking space and information for the changed position of the vehicle, a route correction control section being set to extend by a predetermined distance from an end point of the space recognition correction section when it is determined that the vehicle enters the route correction control section,
   wherein the space recognition correction section is a section where, among obstacles positioned on opposite sides of the initial parking space, an obstacle positioned closer to the vehicle is recognized through the second sensor while the vehicle moves along the first parking route.

2. The parking control apparatus of claim 1, wherein the second unit determines whether to correct the initial parking space based on at least one of a parking space searching angle formed by the obstacle and the vehicle and a parking space searching distance between the obstacle and the vehicle at the time of searching the parking space.

3. The parking control apparatus of claim 2, wherein the second unit corrects the initial parking space when at least one of a situation where the parking space searching angle exceeds a reference angle and a situation where the parking space searching distance is deviated from a reference range.

4. The parking control apparatus of claim 1, wherein the second unit compares information for the obstacle and the first parking route in the space recognition correction section, and when collision between the vehicle and the obstacle is forecasted, the second unit corrects the first parking route to correct the first parking route such that the vehicle can recognize the obstacle without causing the vehicle to collide with the obstacle.

5. The parking control apparatus of claim 1, wherein, when it is determined that the vehicle enters the route correction control section, the second unit controls the vehicle to change the position thereof based on the information for the obstacle recognized in the space recognition correction section.

6. The parking control apparatus of claim 5, wherein the second unit controls the vehicle to change the position thereof such that the vehicle is positioned within a distance range set from the obstacle and the obstacle and that the vehicle are parallel to each other.

7. A parking control method comprising:
   setting an initial parking space by receiving an input of information for at least one obstacle positioned around a moving vehicle from a first sensor to search a parking space;
   calculating a first parking route using information for the initial parking space, and controlling the vehicle to move along the first parking route;
   correcting the initial parking space based on the obstacle recognized in a space recognition correction section and based on a parking space searching speed of the vehicle to set a final parking space when it is determined that the vehicle exists in the space recognition correction section and the parking space searching speed exceeds a reference speed, the space recognition correction section being a section where, among obstacles positioned on opposite sides of the initial parking space, an obstacle positioned closer to the vehicle is recognized through a second sensor while the vehicle moves along the first parking route; and
   controlling the vehicle to change a position thereof and calculating a final parking route based on information for the final parking space and information for a changed position of the vehicle when it is determined the vehicle enters a route correction control section, the route correction control section being set to extend by a predetermined distance from an end point of the space recognition correction section.

* * * * *